(12) United States Patent
Kwak et al.

(10) Patent No.: US 8,113,192 B2
(45) Date of Patent: Feb. 14, 2012

(54) EVACUATED TUBULAR SOLAR COLLECTOR WITH ECCENTRIC TYPE MANIFOLD FLANGE

(75) Inventors: Hee Youl Kwak, Daejeon (KR); Nam Choon Baek, Daejeon (KR); Eung Sang Yoon, Daejeon (KR); Soon Myeong Rhie, Daejeon (KR)

(73) Assignee: Korea Institute of Energy Research, Daejeon (KR)

( * ) Notice: Subject to any disclaimer, the term of this patent is extended or adjusted under 35 U.S.C. 154(b) by 590 days.

(21) Appl. No.: 11/992,610

(22) PCT Filed: Oct. 2, 2006

(86) PCT No.: PCT/KR2006/003962
§ 371 (c)(1),
(2), (4) Date: Apr. 16, 2009

(87) PCT Pub. No.: WO2007/043766
PCT Pub. Date: Apr. 19, 2007

(65) Prior Publication Data
US 2009/0205635 A1 Aug. 20, 2009

(30) Foreign Application Priority Data
Oct. 8, 2005 (KR) .................. 10-2005-0094629

(51) Int. Cl.
*F24J 2/46* (2006.01)
(52) U.S. Cl. .................. 126/569; 126/638; 126/641
(58) Field of Classification Search .................. 126/569, 126/637, 638, 639, 640, 641, 642, 704
See application file for complete search history.

(56) References Cited

U.S. PATENT DOCUMENTS

| 4,505,261 A * | 3/1985 | Hunter ..................... 126/635 |
| 4,604,990 A | 8/1986 | Nikkel et al. |
| 5,596,981 A | 1/1997 | Soucy |
| 2007/0199561 A1 | 8/2007 | Soucy |
| 2009/0173334 A1 | 7/2009 | Krs et al. |

FOREIGN PATENT DOCUMENTS

| JP | 58-069361 | 4/1983 |
| JP | 58-096947 | 6/1983 |
| JP | 60-103252 | 6/1985 |
| KR | 10-2001-0058488 | 7/2001 |

OTHER PUBLICATIONS

International Search Report and Written Opinion for PCT/KR2006/003962 dated Jan. 16, 2007. International Preliminary Report on Patentability for PCT/KR2006/003962 dated Aug. 7, 2007.

* cited by examiner

*Primary Examiner* — Alfred Basichas
(74) *Attorney, Agent, or Firm* — Jenkins, Wilson, Taylor & Hunt, P.A.

(57) ABSTRACT

There is provided an evacuated tubular solar collector with an eccentric type manifold flange capable of changing flow of a heating medium and improving the electric heat performance of a manifold by employing an eccentric end cap with a fluid path and a baffle in the manifold and improving the structure of the manifold. The evacuated tubular solar collector may comprise an evacuated tubular solar collector; a manifold being installed at an upper position of the evacuated tubular solar collector and including a number of heat dissipation holes; eccentric end caps attached to both sides of the manifold, the eccentric end cap including a fluid path; and a baffle attached to an exit of the fluid path through which a fluid flows into. The fluid path and the baffle may be positioned tilted, thereby to improve uniform transfer of heat in the evacuated tubular solar collector.

2 Claims, 5 Drawing Sheets

[Fig. 1]
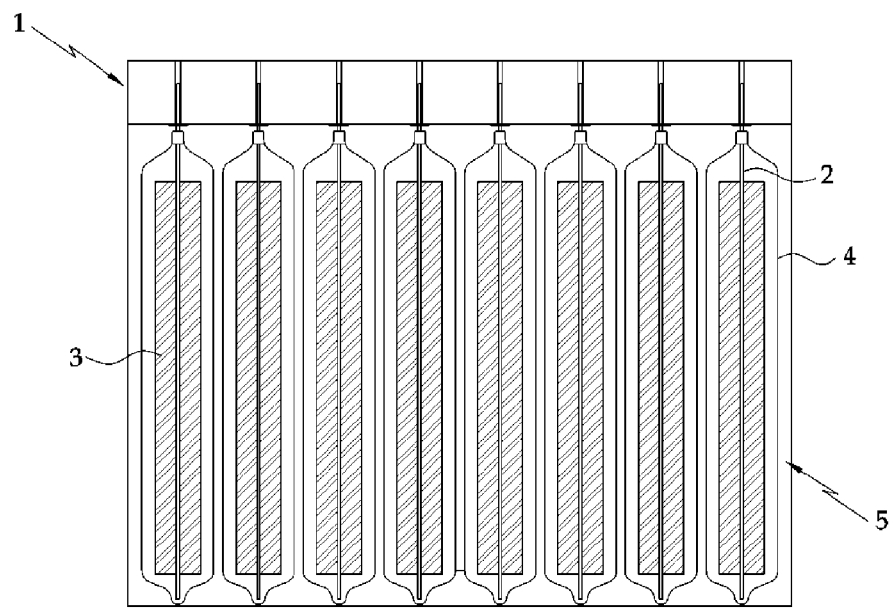
[Fig. 2]
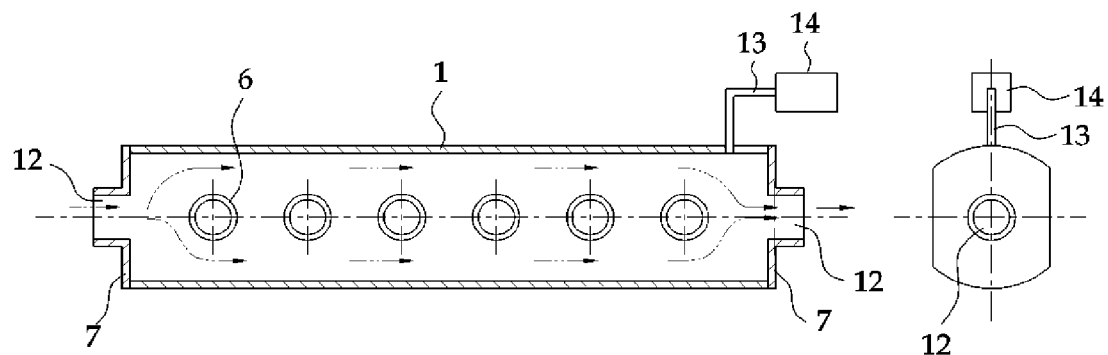
[Fig. 3]
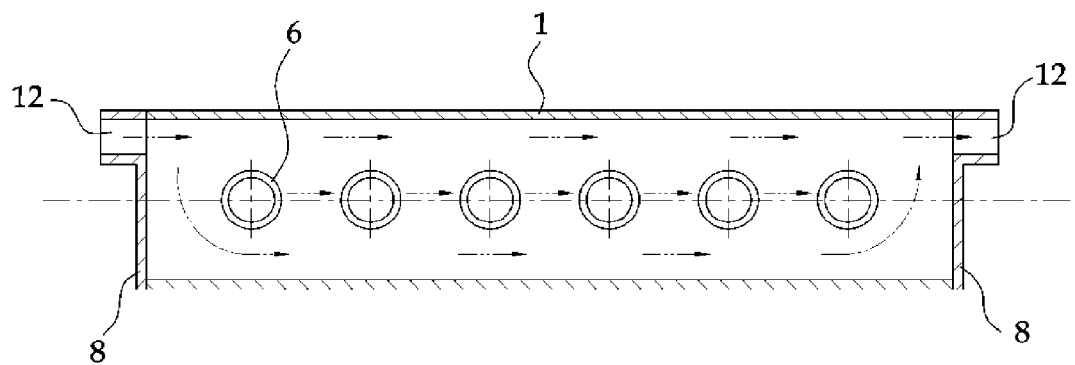

[Fig. 4]
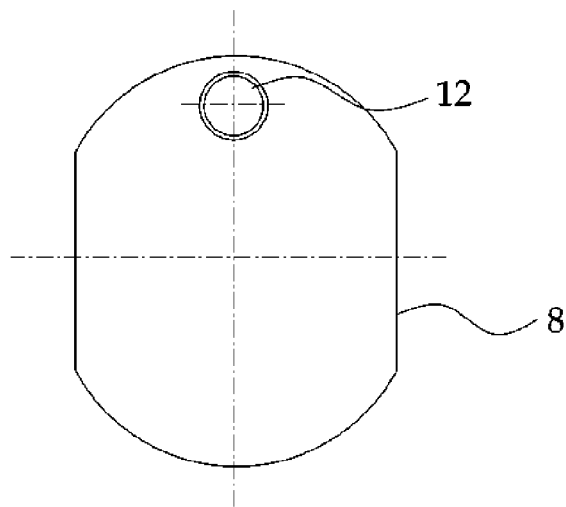
[Fig. 5]
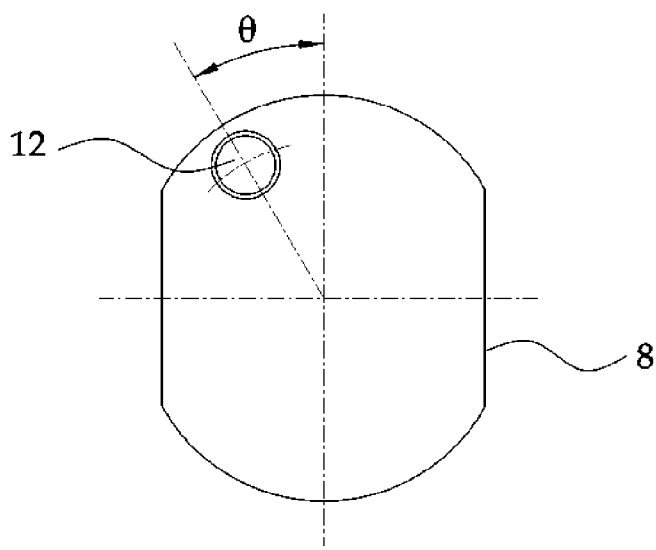
[Fig. 6]
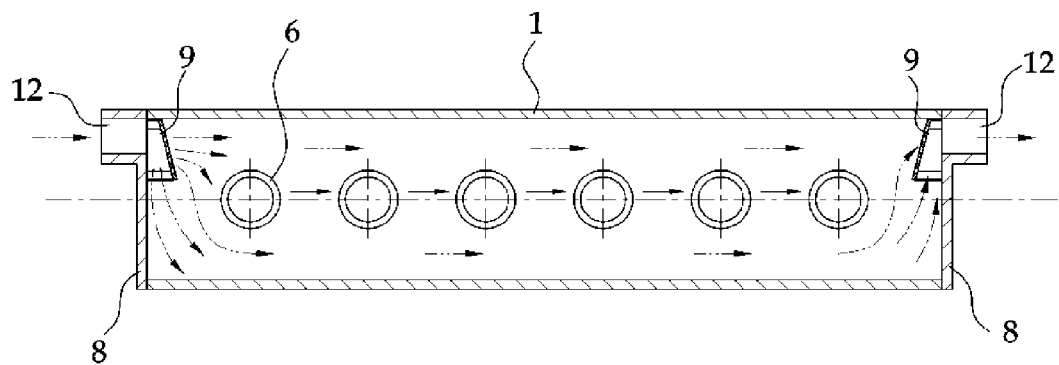

[Fig. 7]
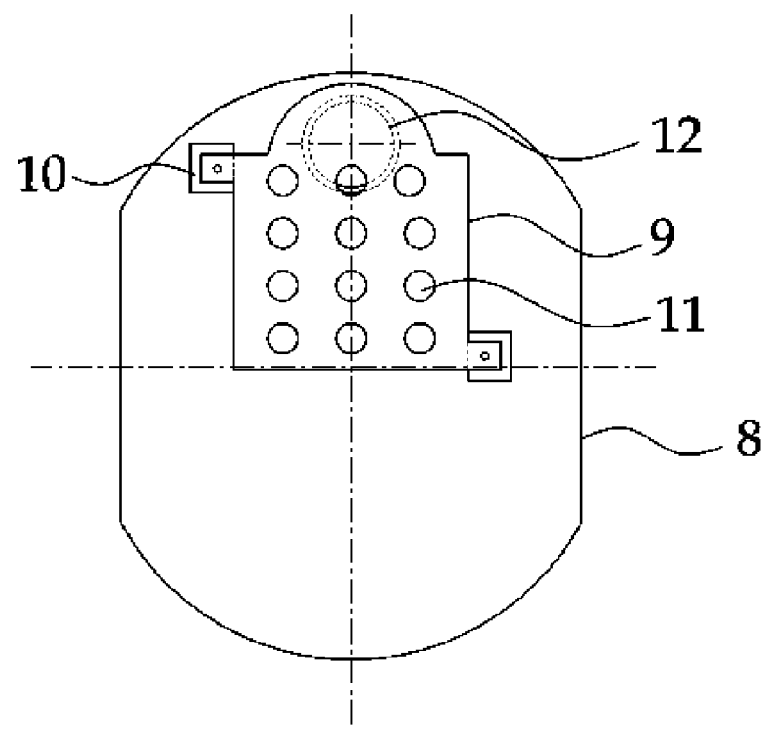
[Fig. 8]
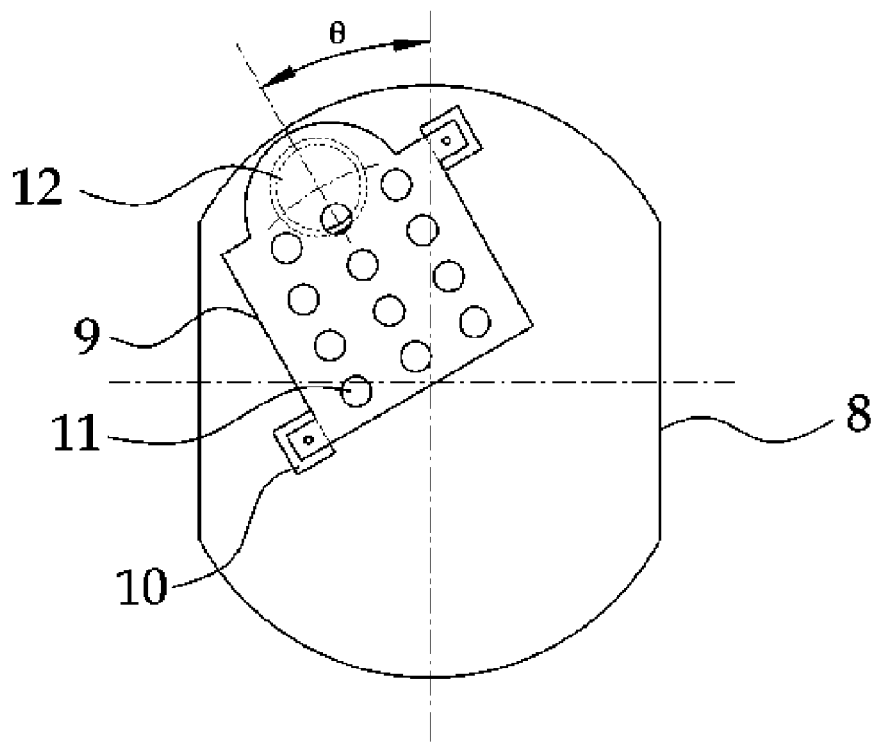

[Fig. 9]
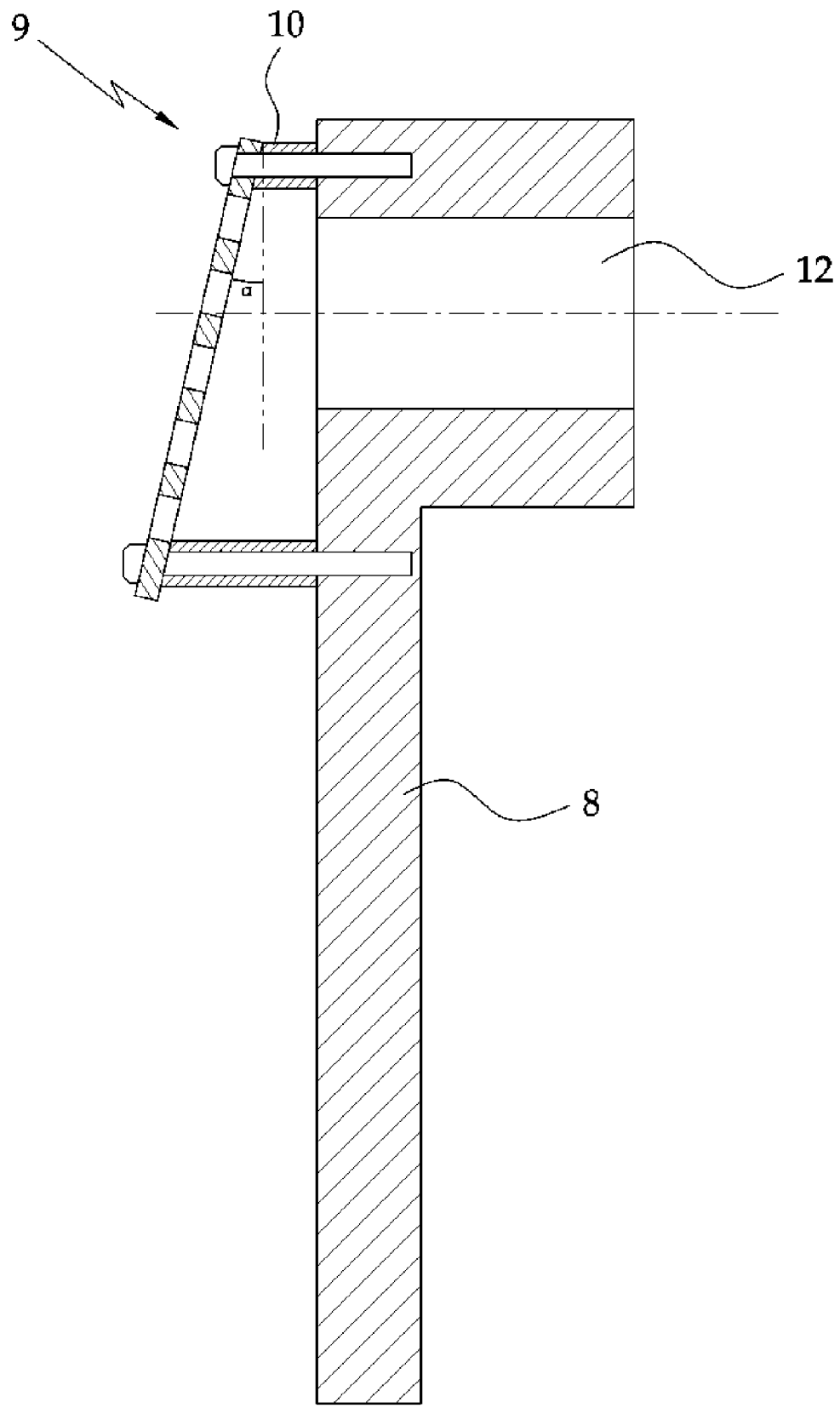

[Fig. 10]
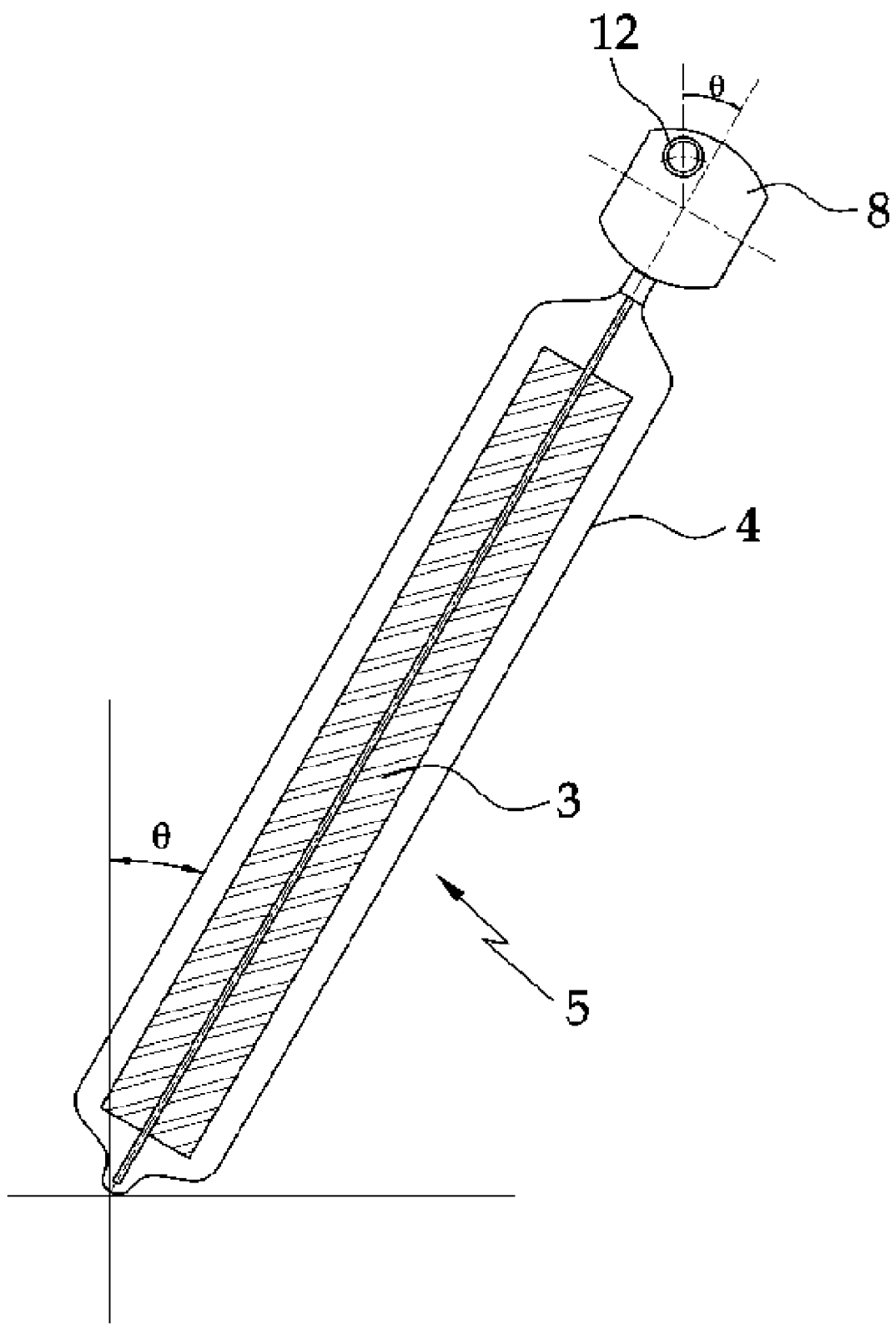

EVACUATED TUBULAR SOLAR COLLECTOR WITH ECCENTRIC TYPE MANIFOLD FLANGE

TECHNICAL FIELD

The present invention relates to an evacuated tubular solar collector with a manifold, and more particularly, to an evacuated tubular solar collector with an eccentric type manifold flange, in which a manifold includes a number of heat dissipation holes positioned along the inside center and spaced apart from one another; and eccentric end caps are respectively attached to both sides of the manifold, each eccentric end cap including a fluid path, wherein the fluid path is formed at an uppermost position of the eccentric end cap highest from a ground surface.

BACKGROUND ART

FIG. 1 is a schematic view of a module of an evacuated tubular solar collector 5. The evacuated tubular solar collector 5 comprises a heat pipe 2, a solar heat absorption plate 3, and a vacuum glass tube 4. The heat pipe 2 is a high efficient electric heat element to transfer heat supplied from the solar heat absorption plate 3 collecting solar heat. The vacuum glass tube 4 includes the solar heat absorption plate 3 and the heat pipe 2 in a vacuum, to minimize a loss of heat.

In use of solar energy which is an unlimited energy source, the high efficiency of a solar collector is most important. The high efficiency of the solar collector is obtained, to some extent, by applying the heat pipe as a high efficient electric heat element and the vacuum technology.

However, when the solar energy is not fully transferred even though it is efficiently collected, a high efficient collector becomes useless. In this regard, the transfer of collected heat energy to a water heater through a heating medium flow conduit, without the loss of heat, is another important variable in determining the overall efficiency of use of the solar energy.

Thus, the optimum design of a heat pipe and a manifold which are a primary gateway to transfer the heat acts as a very important variable.

FIG. 2 is a schematic view of a manifold in a conventional evacuated tubular solar collector 5. In the conventional evacuated tubular solar collector 5, a venting pipe 13 is attached to each manifold 1 where heat exchange is performed between a heat medium and a condenser of a heat pipe 2 which is the electric heat element. In a conventional concentric manifold 1, an air vent 14 by the venting pipe 13 is necessarily needed.

Specifically, in a large evacuated tubular solar system, when a heating medium is supplemented to maintain and manage the solar system, an air needs to be removed from each manifold. This increases a manufacturing cost of a collecting module.

Further, an interior shape is a factor to have a primary effect in raising the efficiency of heat transfer, and the condenser of the heat pipe is fully inserted within the manifold, to indirectly supply a heat source through the heating medium flow conduit. However, since thermal efficiency decreases as the heat transfer resistance increases, an amount of the heat being transferred needs to be maximized, by increasing a contact area between the manifold and the heat pipe. However, in the conventional manifold, since entrance/exit of a fluid which is the heating medium are positioned on the center line in a direction in which the fluid flows, the flowing heating medium does not sufficiently contact with the condenser of the heat pipe. As a result, heat is not uniformly transferred from the condenser of the evacuated tubular solar collector.

DISCLOSURE OF THE INVENTION

Technical Problem

Provided is an evacuated tubular solar collector with an eccentric type manifold flange. An evacuated tubular solar collector with an eccentric type manifold flange in accordance with an embodiment of the present invention comprises: an evacuated tubular solar collector positioned vertical to a ground surface; a manifold being installed at an upper position of the evacuated tubular solar collector and including a number of heat dissipation holes which are arranged on the internal center and spaced apart from one another, the heat dissipation hole receiving a condenser of a heat pipe; eccentric end caps attached to both sides of the manifold, the eccentric end cap including a fluid path; and wherein the fluid path is formed to be at an uppermost position of each eccentric end cap highest from the ground surface.

Further, an evacuated tubular solar collector with an eccentric type manifold flange in accordance with another embodiment of the present invention comprises: an evacuated tubular solar collector positioned by a tilt angle of θ with respect to a line vertical to a ground surface; a manifold being installed at an upper position of the evacuated tubular solar collector and positioned tilted by a tilt angle of θ with respect to the line vertical to the ground surface, and including a number of heat dissipation holes which are arranged on the internal center and spaced apart from one another, the heat dissipation hole receiving a condenser of a heat pipe; eccentric end caps attached to both sides of the manifold, the eccentric end cap including a fluid path; and wherein the fluid path is rotated by the tilt angle of θ with respect to a length direction of the evacuated tubular solar collector, to be formed at an uppermost position of each eccentric end cap highest from the ground surface.

In a conventional manifold, fluid entrance/exit are positioned on the center line in a direction in which a fluid flows. Thus, to discharge the air present within the manifold outside, an air vent by a venting pipe is necessarily installed at an upper part of the manifold.

However, in an evacuated tubular solar collector with an eccentric type manifold flange in accordance with the present invention, an eccentric end cap including a fluid path being eccentrically formed is used, thereby removing the air vent attached to a manifold and reducing a manufacturing cost of the manifold. Furthermore, a baffle including a number of ventilators formed at heating medium entrance/exit is attached, thereby changing the flow of a heating medium and improving the electric heat performance of the manifold.

Advantageous Effects

Therefore, the present invention is directed to provide an evacuated tubular solar collector with an eccentric type manifold flange, which uses eccentric end caps including an air path formed at the highest position, thereby maintaining thermal performance, simplifying a structure of a manifold, reducing manufacturing costs, and making it easy to maintain and manage the manifold; and further, which attaches a baffle including a number of ventilators formed at heating medium entrance/exit inside the eccentric end cap, thereby changing a flow of a heating medium, increasing the heat transfer performance at a contact area between an condenser of a heat pipe and a fluid which is the heating medium, improving the electric heat performance of a manifold, and reducing manufacturing costs.

BRIEF DESCRIPTION OF THE DRAWINGS

The above and other features and advantages of the present invention will become more apparent to those of ordinary skill in the art by describing in detail preferred embodiments thereof with reference to the attached drawings in which:

FIG. 1 is a schematic view of a module of a conventional evacuated tubular solar collector.

FIG. 2 is a schematic view of a manifold of the conventional evacuated tubular solar collector.

FIG. 3 is a schematic view of a manifold of an evacuated tubular solar collector in accordance with an embodiment of the present invention.

FIG. 4 illustrates an end cap in a manifold of an evacuated tubular solar collector, in accordance with a first embodiment of the present invention.

FIG. 5 illustrates an end cap in a manifold of an evacuated tubular solar collector, in accordance with a second embodiment of the present invention.

FIG. 6 is a schematic view of a baffle positioned inside a manifold of the evacuated tubular solar collector in accordance with an embodiment of the present invention.

FIG. 7 illustrates a baffle positioned at an eccentric end cap, in accordance with a first embodiment of the present invention.

FIG. 8 illustrates a baffle positioned at an eccentric end cap, in accordance with a second embodiment of the present invention.

FIG. 9 is a side view of the baffle positioned at the eccentric end cap in accordance with an embodiment of the present invention.

FIG. 10 is a schematic view of a module of an evacuated tubular solar collector in accordance with an embodiment of the present invention.

EXPLANATION ON ESSENTIAL ELEMENTS OF DRAWINGS

1: manifold
2: heat pipe
3: solar heat absorption plate
4: vacuum glass tube
5: evacuated tubular solar collector
6: heat dissipation holes
7: end cap
8: eccentric end cap
9: baffle
10: holder
11: ventilators
12: fluid path
13: venting pipe
14: air vent

BEST MODE FOR CARRYING OUT THE INVENTION

The present invention will now be described more fully hereinafter with reference to the accompanying drawings, in which preferred embodiments of the invention are shown. This invention may, however, be embodied in many different forms and should not be construed as being limited to the embodiments set forth herein. Rather, these embodiments are provided so that this disclosure will be thorough and complete, and will fully convey the scope of the invention to those skilled in the art. Like numbers refer to like elements throughout the specification.

FIG. 3 is a schematic view of a manifold of an evacuated tubular solar collector in accordance with an embodiment of the present invention, and FIG. 4 illustrates an end cap in a manifold of an evacuated tubular solar collector in accordance with a first embodiment of the present invention.

The evacuated tubular solar collector with the eccentric type manifold flange comprises an evacuated tubular solar collector 5, a manifold 1 and an eccentric end cap 8. The evacuated tubular solar collector 5 is positioned vertical to a ground surface. The manifold 1 is positioned at an upper part of the evacuated tubular solar collector 5 and includes a number of heat dissipation holes 6 arranged along the inside center and spaced apart from one another. The heat dissipation hole 6 is formed to receive a condenser of a heat pipe 2. The eccentric end caps 8 are respectively attached to both sides of the manifold 1 and include a fluid path 12. The fluid path 12 is formed at an uppermost position of each eccentric end cap 8.

In the evacuated tubular solar collector positioned vertical to the ground surface, heat being dissipated from the condenser of the heat pipe 2 is condensed by a fluid which is a heating medium, and the heat is returned to an evaporator of the heat pipe 2. The heating medium absorbing the dissipated heat has certain thermal energy and is supplied and used when necessary.

In the evacuated tubular solar collector 5, a number of the heat pipes 2 are formed to increase thermal capacity. To effectively transfer the heat, the condenser of the heat pipe 2 is inserted into the manifold, thereby absorbing required heat.

In the present invention, to discharge the air being present within the manifold which is a component to supply the heating medium, a path through which the fluid enters and exits is formed at the uppermost position of the manifold.

FIG. 5 illustrates an end cap of a manifold of an evacuated tubular solar collector in accordance with a second embodiment of the present invention, and FIG. 10 is a schematic view of a module of an evacuated tubular solar collector in accordance with a second embodiment of the present invention.

The evacuated tubular solar collector with an eccentric type manifold flange comprises an evacuated tubular solar collector 5, a manifold 1 and an eccentric end cap 8. The evacuated tubular solar collector 5 is positioned tilted by an angle of θ with respect to a line vertical to a ground surface. The manifold 1 is positioned tilted by the tilt angle of θ with respect to the line vertical to the ground surface at an upper part of the evacuated tubular solar collector 5 and includes a number of heat dissipation holes 6 arranged along the inside center line and spaced apart from one another. The heat dissipation hole 6 is formed to receive a condenser of a heat pipe 2. The eccentric end caps 8 are respectively attached to both sides of the manifold 1 and include a fluid path 12. The fluid path 12 is formed at an uppermost position of each eccentric end cap 8 by being rotated by the angle of θ with respect to a length direction of the evacuated tubular solar collector 5.

Generally, an evacuated tubular solar collector is installed tilted by a predetermined angle with respect to the line vertical to the ground surface. A heat pipe is tilted by the tilt angle θ with respect to the line vertical to the ground surface. A condenser of the heat pipe is positioned at the upper part, and the condenser is operatively inserted into a manifold.

In the evacuated tubular solar collector installed tilted by an angle with respect to a line vertical to a ground surface, the fluid path, which is formed in each of the eccentric end caps installed at both sides of the manifold, is installed rotated by the tilt angle with respect to the length direction of the solar collector, the fluid path is positioned at the highest position of the solar collector from the ground surface.

FIG. 7 illustrates a baffle 9 installed at an eccentric end cap 8 in accordance with a first embodiment of the present invention.

In the eccentric end cap 8, the baffle 9 is attached to an exit of the fluid path 12 through which the fluid flows into. The baffle 9 includes a number of ventilators 11. For a uniform flow, the fluid uniformly contacts with the heat dissipation holes 6 through the ventilators 11. The baffle 9 is attached along a vertical line of the eccentric end cap 8.

The baffle in accordance with the embodiment shown in FIG. 7 enables the heating medium supplied into the manifold to sufficiently thermally contact with the condenser of the heat pipe through the fluid path, thereby sufficiently and efficiently absorbing the heat generated from the condenser.

FIG. 8 illustrates a baffle 9 installed at an eccentric end cap 8 in accordance with a second embodiment of the present invention.

In the eccentric end cap 8, the baffle 9 is attached to an exit of the fluid path 12 through which the fluid flows into. The baffle 9 includes a number of ventilators 11. For a uniform flow, the fluid uniformly contacts with the heat dissipation holes 6 through the ventilators 11. The baffle 9 is attached along a line tilted by the angle of θ with respect to a vertical line of the eccentric end cap 8.

In accordance with the embodiment shown in FIG. 10, the evacuated tubular solar collector is installed tilted by a predetermined tilt angle with respect to a line vertical to a ground surface, and thus the fluid path 12 is rotated by the tilt angle with respect to the line vertical to the ground surface, corresponding to the tilted evacuated tubular solar collector, and is positioned at the highest position from the ground surface.

The baffle in accordance with the embodiment shown in FIG. 8 is attached along a line tilted by the tilt angle of θ with respect to a vertical line of the eccentric end cap 8.

In the embodiments of FIGS. 7 and 8, the diameter of the ventilators 11 formed on the upper position of the baffle 9 is smaller than that of the ventilators 11 formed on the lower position of the baffle 9, so that the uniform thermal contact is performed between the fluid which is the heating medium and the heat dissipation holes 6.

Since the fluid path is positioned at the uppermost part of the manifold, most heating fluid flows at the upside of the manifold when the fluid flows into. Consequently, sufficient thermal contact is not generated in the center of the manifold which the condenser of the heat pipe is inserted into. To solve the aforementioned problem, the baffle is installed, and further, the ventilators formed on the baffle are formed to have different diameters, i.e., the diameter of the ventilators formed on the upper position of the baffle is smaller than that of the ventilators formed on the lower position thereof, thereby performing a more effective thermal contact.

FIG. 9 is a side view of a baffle 9 installed at an eccentric end cap 8 in accordance of an embodiment of the present invention.

The baffle 9 is attached to the eccentric end cap 8, sloped by a predetermined slope angle of α with respect to an inside surface of the eccentric end cap 8, so that the fluid more flows into downward the manifold.

The fluid path of the eccentric end cap is formed at the upper position. To prevent the fluid from flowing focused on the upper part inside the manifold, the fluid needs to more flow downward, thereby generating the uniform flow of the fluid inside the manifold.

Further, a protruding holder 10 is formed inside the eccentric end cap 8 to which the baffle 9 is attached. The holder 10 is held by a fixing unit. When the baffle is attached to the eccentric end cap, using the fixing unit such as a screw, the holder prevents a through-hole from occurring on the thin eccentric end cap.

In the present invention, the baffle 9 is attached to the inside of the eccentric end cap 8 installed at the side of the manifold 1. That is, the baffle 9 is attached to the inside of the eccentric end cap through which the fluid as the heating medium flows into, the inside of the eccentric end cap through which the fluid is discharged, or both sides of the eccentric end cap 8.

This is to uniformly control the flow of the heating medium inside the manifold, thereby performing the sufficient thermal contact between the heating medium and the condenser of the heat pipe, to increase mutual thermal transfer.

The present invention has been described in reference to the embodiments illustrated in the drawings. However, it is to be understood that the scope of the invention is not limited to the disclosed embodiments. On the contrary, the scope of the invention is intended to include various modifications and alternative arrangements within the capabilities of persons skilled in the art using presently known or future technologies and equivalents. The scope of the claims, therefore, should be accorded the broadest interpretation so as to encompass all such modifications and similar arrangements.

The invention claimed is:

1. An evacuated tubular solar collector with an eccentric type manifold flange, comprising:
    an evacuated tubular solar collector positioned vertically to a ground surface;
    a manifold being installed at an upper position of the evacuated tubular solar collector and including a protruding holder and a number of heat dissipation holes which are arranged on an internal center of the manifold and spaced apart from one another, the heat dissipation holes receiving a condenser of a heat pipe; and
    eccentric end caps attached to both sides of the manifold, each of the eccentric end caps including a fluid path and a baffle,
    wherein the fluid path is formed at an uppermost position of each of the eccentric end caps highest from the ground surface;
    wherein the baffle of each of the eccentric end caps comprises a number of ventilators and is attached along a vertical line of each of the eccentric end caps at an exit of the fluid path through which a fluid flows into, so that, for a uniform flow, the fluid uniformly contacts the heat dissipation holes positioned inside the manifold;
    further, the baffle attached to each of the eccentric end caps is sloped by a predetermined slope angle α with respect to an inside surface of the eccentric end caps, so that the fluid flows into a lower part of the manifold; and
    further, the baffle attached to the inside of each of the eccentric end caps attached to both sides of the manifold, in which the baffle is attached to the inside of the eccentric end caps through which the fluid as a heat medium flows into, the inside of the eccentric end caps through which the fluid is discharged, or both sides of the eccentric end caps; and
    wherein the protruding holder is formed inside the manifold at which the baffle is attached, so that the baffle is held using a fixing unit.

2. An evacuated tubular solar collector with an eccentric type manifold flange, comprising:
- an evacuated tubular solar collector being positioned at a tilt angle of θ with respect to a line vertical to a ground surface;
- a manifold being installed at an upper position of the evacuated tubular solar collector and positioned tilted by the tilt angle of θ with respect to the line vertical to the ground surface, and including a protruding holder and a number of heat dissipation holes which are arranged on an internal center of the manifold and spaced apart from one another, the heat dissipation holes receiving a condenser of a heat pipe; and
- eccentric end caps attached to both sides of the manifold, each of the eccentric end caps including a fluid path and a baffle,
- wherein the fluid path is rotated by the tilt angle of θ with respect to a length direction of the evacuated tubular solar collector, to be positioned at an uppermost position of each of the eccentric end caps highest from the ground surface;
- wherein the baffle of each of the eccentric end caps comprises a number of ventilators and is attached along a vertical line of each of the eccentric end caps at an exit of the fluid path through which a fluid flows into, so that, for a uniform flow, the fluid uniformly contacts the heat dissipation holes positioned inside the manifold;
- further, the baffle attached to each of the eccentric end caps is sloped by a predetermined slope angle α with respect to an inside surface of each of the eccentric end caps, so that the fluid flows into a lower part of the manifold; and
- further, the baffle attached to the inside of each of the eccentric end caps attached to both sides of the manifold, in which the baffle is attached to the inside of the eccentric end cap through which the fluid as a heat medium flows into, the inside of the eccentric end cap through which the fluid is discharged, or both sides of the eccentric end caps; and
- wherein the protruding holder is formed inside the manifold at which the baffle is attached, so that the baffle is held using a fixing unit.

* * * * *